United States Patent
Batiste

[11] Patent Number: 5,879,037
[45] Date of Patent: Mar. 9, 1999

[54] VEHICLE SIDE PANEL DENT PREVENTER

[76] Inventor: Rene C. Batiste, 3454 Golden Sage Dr., No. Las Vegas, Nev. 89030

[21] Appl. No.: 604,221

[22] Filed: Feb. 22, 1996

[51] Int. Cl.$^6$ .................................................... B60R 19/42
[52] U.S. Cl. ............................................ 293/118; 293/128
[58] Field of Search ............................ 293/128, DIG. 6, 293/118; 52/716.5, 717.04, 717.05

[56] References Cited

U.S. PATENT DOCUMENTS

| | | | |
|---|---|---|---|
| 3,563,594 | 2/1971 | London | 293/128 |
| 3,582,134 | 6/1971 | Shaff | 293/128 |
| 4,277,526 | 7/1981 | Jackson | 293/128 X |
| 4,726,614 | 2/1988 | Myers et al. | 293/128 |
| 4,753,467 | 6/1988 | DeCaluwe et al. | 293/128 X |
| 4,823,724 | 4/1989 | Lumpkin | 114/219 X |
| 4,948,637 | 8/1990 | Kessler | 293/128 X |
| 4,963,403 | 10/1990 | Roberts et al. | 293/128 X |
| 5,071,181 | 12/1991 | Wagner | 293/128 |

Primary Examiner—Andrew C. Pike
Attorney, Agent, or Firm—Harry M. Weiss; Jeff Moy; Harry M. Weiss & Associates, P.C.

[57] ABSTRACT

An elongated, tubular shaped plastic case housing (13A) with an attached opening door (13) and its mounting (16) retains an elongated impact absorbing pad (1) and its inner retracting cord mechanism (4). Pad (1) when placed on vehicle works as a barrier between a vehicle door being struck and the other striking. Magnets (3) inside pad (1) attracts pad to vehicle panels.

4 Claims, 4 Drawing Sheets

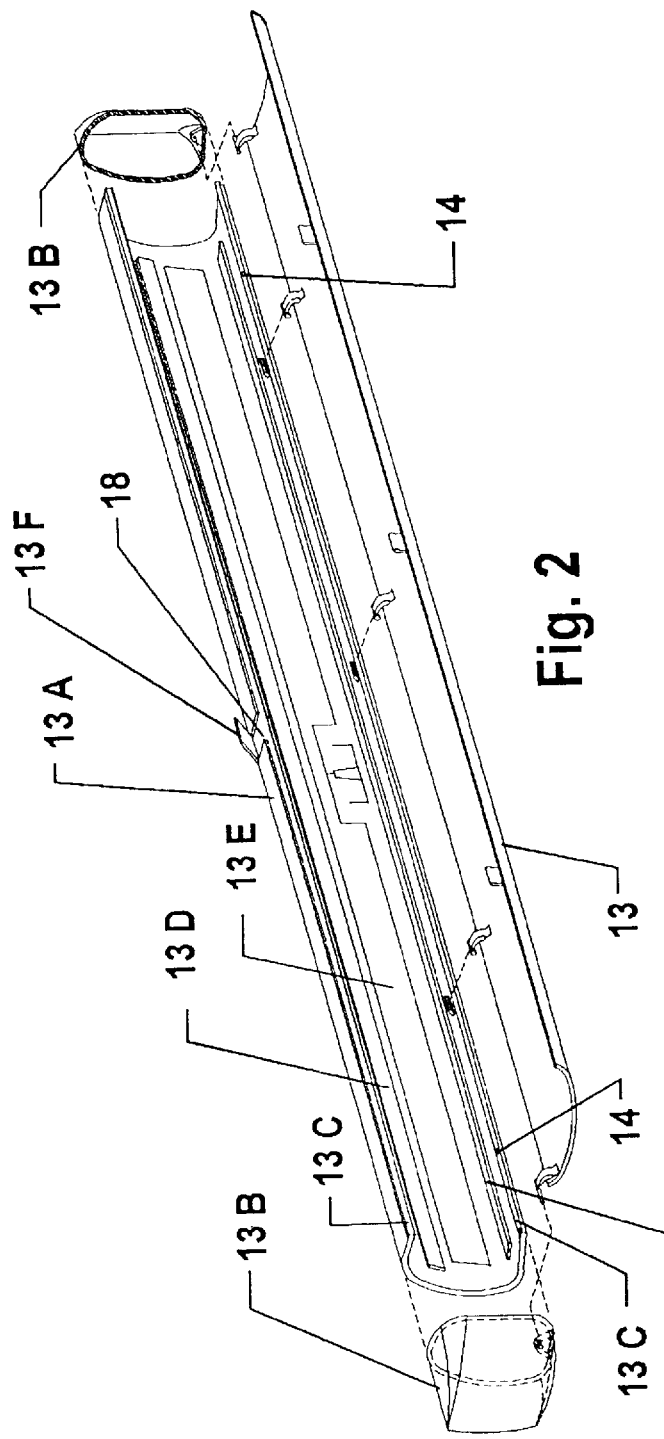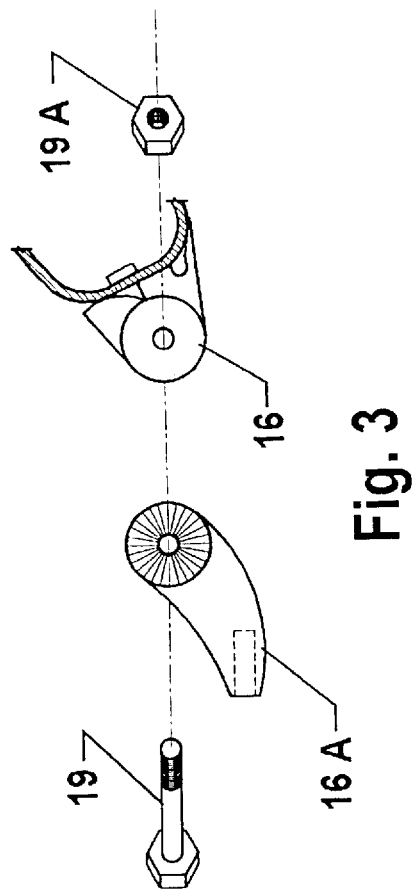

VEHICLE SIDE PANEL DENT PREVENTER

BACKGROUND—FIELD OF INVENTION

This invention relates to door guards that minimize the occurrence of dents to vehicle side panels.

BACKGROUND—DESCRIPTION OF PRIOR ART

Since the early making of the streamlined automobile, preventing door dings/dents has been an unsolved problem and issue of concern for many vehicle owners. Car manufactures and independent aftermarket companies (also inventors) have attempted to provide some kind of protection by creating permanent type door protective strips which provide absolutely no protection from an opening door of a vehicle being the opposite.

These types of strips described usually range from ½" to 1½ inch in width and extend ¾ of vehicle length; most are dysfunctional; and only enhance the appearance of a vehicle but provide no protection for one's investment.

In the investigation of my prior-art research, different types of door guards were located, most of minimal or questionable effectiveness and limited accessibility for usage by the general public (U.S. Pat. Nos. 4,002,363 to John R. James (1977), 4,127,294 to Charles Cooper (1978), 4,014,583 to Authur A. Forbes (1977), 4,221,410 to Jeffery S. Dawson (1980), 4,221,412 to Diane Miller (1980), 4,217,715 to William G. Bryan, Jr. (1980), 4,401,331 Edward H. Ziner et al. (1983), 4,398,758 to Gilbert Tabares (1983)). All are plagued by complicated set-up, inefficient storage, and an unsightly appearance that decreases the aesthetic appeal of numerous vehicles.

Accordingly, some of the above described devices mounted to the undercarriage of a vehicle wouldn't work because of vehicle components' interference and can make repairs in an automotive shop for most cars cost more if needed to remove the device from beneath. For example, U.S. Pat. No. 4,437,697 to Paul B. Hinojos (1984) shows a retractable telescopic guard device that retains tubular mounting means that makes it impossible for most vehicles to be put on a shop hoist unless the device is removed. His device also shows interference to exhaust and suspension system components.

U.S. Pat. No. 4,498,697 to William E. Mc Glone and Leonard J. Genest (1985) shows a "D" channel configuration that works by magnetic attraction, but doesn't offer permanent storage attatched to a vehicle, a retractable safety-cord, and doesn't offer the desired coverage most vehicles need.

U.S. Pat. No. 4,493,502 to Valtin T. Campbell, Jr. (1985) displays a retracting wound-up strap roll with some means of attachment, but doesn't mention any element of absorbing characteristics to withstand impacts. His design mounts to one end of vehicle fender well, and is pulled along and attatched to the other; unlike U.S. Pat. No. 5,312,145 to Robert A. McNeil (1994) which displays a foldable magnetic attracting blanket apparatus, but doesn't offer quick storage and set-up, nor does it provide the adequate thickness to resist heavy impacts from the opening door of another vehicle.

OBJECTS AND ADVANTAGES

Accordingly, several objects and advantages of my described invention are:

(a) able to fit most vehicles foreign and domestic.
(b) can be transferred from one vehicle to another.
(c) can provide adequate protection in preventing dents to a vehicle's side panel.
(d) promotes higher resale value of a vehicle.
(e) is a self-contained unit that requires minimal set up and storage time.
(f) an exterior designed to look as part of vehicle.
(g) an exterior case that can be painted to match the exterior of vehicle.
(h) it uses a retractable safety-cord inside the guard pad to prevent theft.
(i) its guard pad uses a system of locking magnets that assures bonding to the contour of a vehicle panel.

DRAWING FIGURES

FIG. 2 shows an exploded view of the preferred embodiment of the invention.

FIG. 3 is a plan view of a mounting bracket for a case in the embodiment of FIG. 1.

Figure 1:
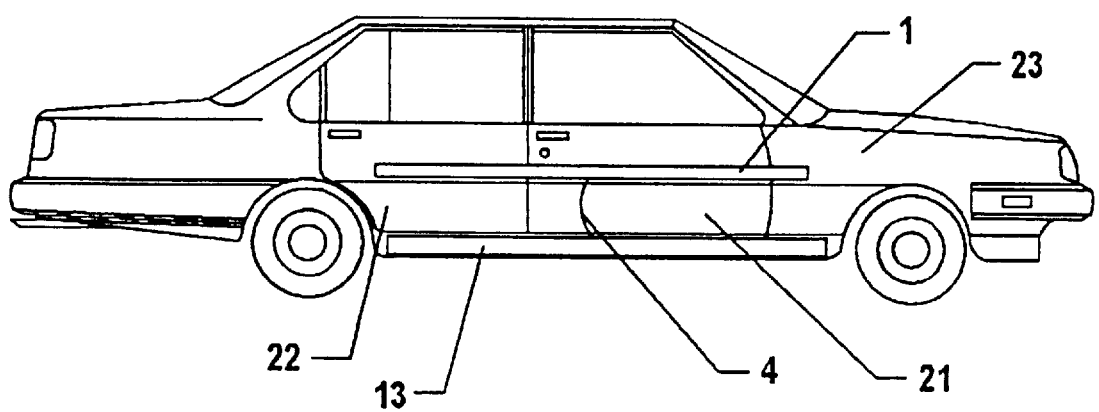
FIG. 1 shows the guard case mounted to a vehicle with its guard pad placed horizontally along the vehicle.

REFERENCE NUMERALS IN DRAWINGS 1. pad, sealed
2. pad member with retractable cord mechanism
3. internal magnets
4. safety cord
8. limiting return coil
13. case door
13A. case
13B. case end cap
13C. case seals
13D. foam support strips
13E. metal attracting plate
13F. cord passage lid
14. drain parts
16. case mount, (lateral adjustment)
16A. pivot arm, (vertical adjustment)
18. cord passage lid return spring
19. screw to pivot arm
19A. jam nut, recessed in case mount
21. front rt. passenger door of vehicle
22. rear rt. passenger door of vehicle
23. rt. front fender of vehicle

DESCRIPTION—FIGS. 1 TO 5

Figure 4:
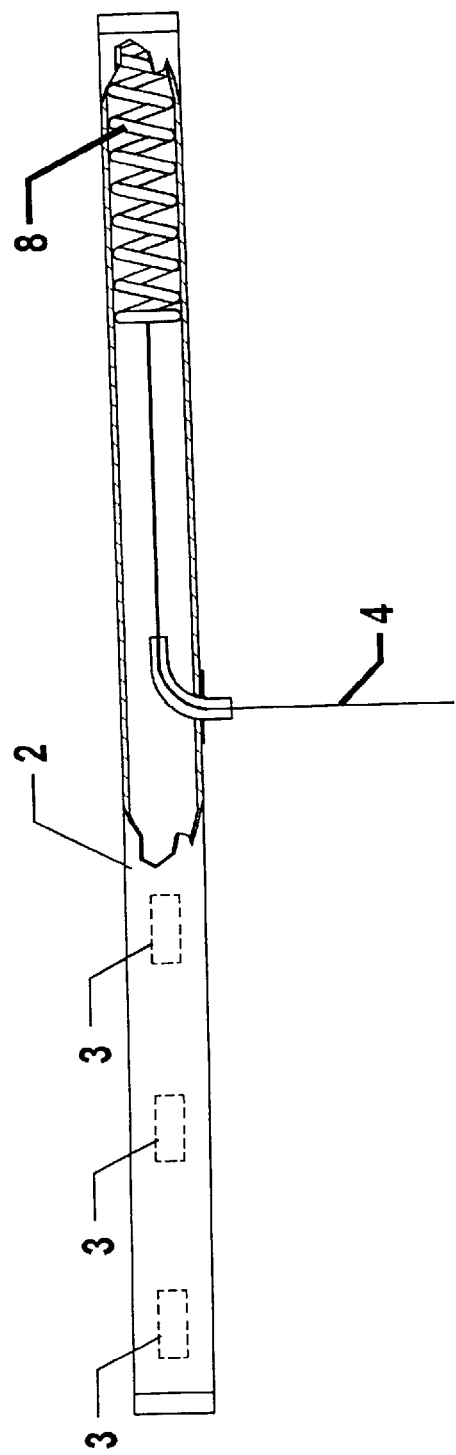
FIG. 4 shows the pad's tube member.

FIG. 2 shows an exploded view of the entire invention. In FIG. 2, pad 1 is a semirigid foam material with a flexible urethane plastic material sealing the exterior. The flexible urethane lining is used to seal the attracting magnets within the backside of pad 1 and to make it water resistant. Also shown within pad 1 is the internal tube member 2 which houses the retractable cord mechanism shown in FIG. 4. The tube member also assists the pad to withstand higher impacts and keeps pad in a straight, lateral form.

The pad housing cases 13A and 13B are made of plastic; 13C are thin, flint seals at top and bottom of case door 13, 13D are thin, foam strips within case 13A extending the entire length of case 13A to assure pad being in stable position when stored within; and 13E is a thin, lightweight metal strip for backside mounting and to aid in assistance of 13D (foam strips) by attracting magnets within pad 1 creating a stable structure inside of case 13. Cord passage lid 13F is used to allow retractable safety-cord 4 to exit case when closed and pad is placed on vehicle.

14 are drain ports to exit moisture within case 13A. A locking device to assure security of system is optional. Case mount 16 is formed fitted to bottom side of case exterior 13A and is a laterally adjustable mount that works in conjunction with pivot arm 16A which is a vertical adjuster, both having inner formed wedges that mesh together assuring stability by the tightening of screw 19 and jam nut 19A. Both case mounts 16 and 16A are mounted to bracket system beneath vehicle which supports the entire structure of case 13. Return spring 18 is used to return cord passage lid 13F to a closed position when case door 13 is in an open position and pad 1 is stored within case 13A.

OPERATION—FIGS. 1–5

The manner of using the described invention is:

Once the guard case 13A is mounted to the lower center section of a vehicle, a person sets-up the system by separating case door 13 from top of case 13A to a downward position. Case door 13 will come to a rest position, allowing pad 1 to be exposed. Once pad 1 is exposed, a person (using both hands) grabs pad 1 at opposite ends removing it from case 13A. Once removed, pad 1 is placed vertically over 21,22, and 23 shown in FIG. 1 providing maximum coverage. Bonding means, such as attracting magnets 3, within pad 1 attract the entire pad structure to the side metal panels of a vehicle assuring a locking bond between vehicle door panels and pad 1.

As pad 1 is being pulled away from case 13A, retractable cord 4 anchored to case 13A is extracted from within pad 1 and passes directly thru cord passage lid 13F which is an exit path for retractable cord 4. Retracting means, such as spring 8, provides tension to cord anchor 4 by forcing it into a downward position when pad 1 is stored away, minimizing cord wrap-up within case 13A.

After pad 1 is placed at desired position of vehicle, a person then closes case door 13 to its original position. Cord passage lid 13 remains in an upward position by the vertical passing interference of retractable cord 4. Return spring 18 is used to return cord passage lid 13F to a downward position when pad 1 is returned and securely placed within case 13.

SUMMARY, RAMIFICATIONS, AND SCOPE

Figure 5:
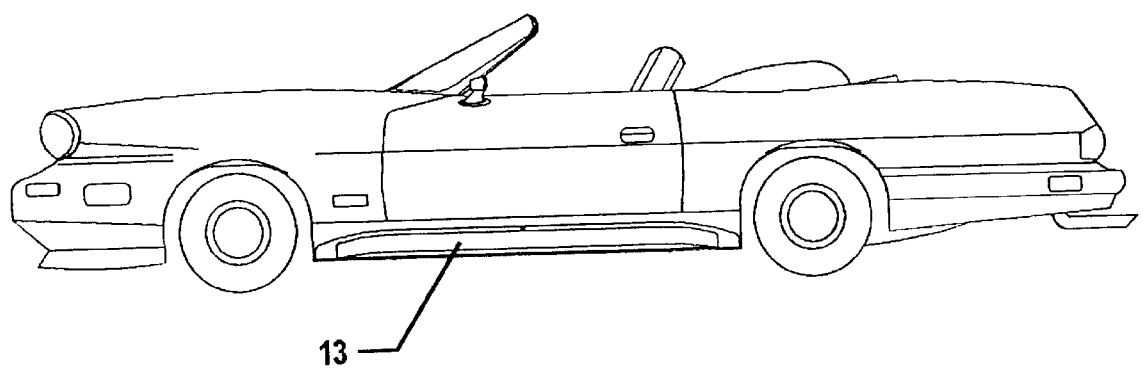
FIG. 5 is a side elevational view of a vehicle having a guard case mounted thereon.

Accordingly, this is designed to assist in the prevention of vehicle side panel damage by extraneous forces attributable to other person(s) or vehicles. The entire case structure is made of plastic with exception of the pad being made of a rigid absorbing foam material which disallows a panel striking, or one being struck, from becoming damaged. This invention is designed to fit and is made to protect most vehicles such as Volvo, Lexus, BMW, and Jaguar and has certain advantages such as:

- the exterior case can be relocated to another vehicle as long as the vehicle is made to except this system;
- the exterior can be painted to match the exterior color of vehicle applied to;
- the system helps to retain higher resale value of vehicle by preserving original appearance;
- the inner absorbing pad can be removed and used as a cushion device for other parts of a vehicle's exterior;
- the pad can be made into circular-tubular form, making it independent and mobile for vehicles that cannot accept the outer pad casing;
- the outer casing structure can be made into other shapes and forms to accommodate vehicles of a midbodied, aerodynamic shape and certain vehicles that require the door guard case to be mounted directly to factory midcentered flair skirts as shown in FIG. 5.

Although the description above contains many specificities, the scope of the invention should be determined by the appended claims and their legal equivalents, rather than by the examples given.

I claim:

1. A vehicle side panel dent preventer comprising:
    an impact absorbing pad;
    means for releasably mounting said pad to a side panel of a vehicle;
    a housing for storing said pad when said pad is removed from the side panel;
    means for mounting said housing onto the vehicle; and
    a cord having a first end connected to said pad, a second end connected to said housing, and an intermediate portion between said ends;
    wherein said housing includes an interior into which said pad is movable and from which said pad is removable, a door lid movably mounted to said housing for opening and closing said interior, and a passage lid movably mounted to said housing through which said intermediate portion passes when said pad is removed from said housing and said door lid closes said interior.

2. The dent preventer of claim 1 wherein said releasably mounting means comprises a plurality of magnets disposed within said pad.

3. The dent preventer of claim 1 further including a spring connected to an interior portion of said pad and to said cord.

4. The dent preventer of claim 1 wherein said housing has a drain port that permits drainage of at least one of fluids and moisture from said housing.

* * * * *